(12) United States Patent
Sullivan et al.

(10) Patent No.: US 6,618,246 B2
(45) Date of Patent: Sep. 9, 2003

(54) DATA STORAGE HOUSING

(75) Inventors: Patrick L. Sullivan, Minnetonka, MN (US); Terrance A. Dilling, Apple Valley, MN (US); Clarence R. Mackley, Burnsville, MN (US); Nathan J. Hastad, Richfield, MN (US)

(73) Assignee: General Dynamics Information Systems, Bloomington, MN (US)

( * ) Notice: Subject to any disclaimer, the term of this patent is extended or adjusted under 35 U.S.C. 154(b) by 0 days.

(21) Appl. No.: 09/973,098

(22) Filed: Oct. 9, 2001

(65) Prior Publication Data

US 2002/0030981 A1 Mar. 14, 2002

Related U.S. Application Data

(63) Continuation of application No. 09/496,322, filed on Feb. 2, 2000, now Pat. No. 6,320,744.
(60) Provisional application No. 60/156,413, filed on Sep. 28, 1999, and provisional application No. 60/121,000, filed on Feb. 19, 1999.

(51) Int. Cl.$^7$ .............................. H05K 5/00; H05K 7/00; G06F 1/16
(52) U.S. Cl. ........................ 361/685; 361/683; 361/752; 312/223.2
(58) Field of Search ................................ 361/683–685, 361/752–753, 730; 312/223.1–223.2, 332.1, 333

(56) References Cited

U.S. PATENT DOCUMENTS 4,488,192 A  12/1984  Treseder ...................... 360/98
4,556,969 A  12/1985  Treseder et al. ............. 369/291
4,713,714 A  12/1987  Gatti et al. .................. 360/137

(List continued on next page.)

FOREIGN PATENT DOCUMENTS

WO    WO9411870    10/1993

*Primary Examiner*—Kamand Cuneo
*Assistant Examiner*—Tuan Dinh
(74) *Attorney, Agent, or Firm*—Jenner & Block, LLC

(57) ABSTRACT

An array module containing an array of electronic units is mounted in an installation frame. The electronic units can be mounted by rails in a hermetically sealed array housing and blind-mate connectors can connect the units to a rear plate. Blind-mate connectors also can connect the rear plate to the installation frame for external connection. A plurality of resilient mounts are fastened to the installation frame to protect the frame and storage array module from external shock. A thermal transfer mechanism transfers thermal energy between the electronic units and a region exterior to the installation frame. The electronic units can be enclosed in hermetically sealed chambers having side rails for rigidly fastened to the unit and a resilient support connecting the side rails to at least one of the covers of the hermetically sealed chamber. Thermal rails can be permanently mounted by a plurality of resilient thermal conductors to either the side rails or one of the covers, and a fastener removably mounts the thermal rails to the other of the side rails or one of the covers so that the thermal rails and resilient thermal conductors provide conduction of thermal energy between the side rails and one of the covers.

38 Claims, 8 Drawing Sheets

U.S. PATENT DOCUMENTS

| | | | | |
|---|---|---|---|---|
| 4,812,932 | A | 3/1989 | Hishinuma et al. | 360/97.01 |
| 4,831,476 | A | 5/1989 | Branc et al. | 360/97.02 |
| 4,833,554 | A | 5/1989 | Dalziel et al. | 360/98.04 |
| 4,870,703 | A | 9/1989 | Augeri et al. | 360/98.07 |
| 4,893,210 | A | 1/1990 | Mintzlaff | 360/137 |
| 4,908,715 | A | 3/1990 | Krum et al. | 360/97.02 |
| 4,965,691 | A | 10/1990 | Iftikar et al. | 360/133 |
| 4,979,062 | A | 12/1990 | Stefanshy et al. | 360/97.02 |
| 4,980,786 | A | 12/1990 | O'Sullivan et al. | 360/97.03 |
| 5,079,655 | A | 1/1992 | Yagi | 360/97.02 |
| 5,122,914 | A | 6/1992 | Hanson | 360/98.01 |
| 5,124,855 | A | 6/1992 | Dew et al. | 360/97.02 |
| 5,223,996 | A | 6/1993 | Read et al. | 360/97.02 |
| 5,243,479 | A | 9/1993 | Nakagoshi et al. | 360/98.01 |
| 5,243,495 | A | 9/1993 | Read et al. | 361/685 |
| 5,333,098 | A | 7/1994 | DeLuca et al. | 361/685 |
| 5,349,486 | A | 9/1994 | Sugimoto et al. | 360/97.01 |
| 5,422,767 | A | 6/1995 | Hatchett et al. | 360/98.01 |
| 5,483,398 | A | 1/1996 | Boutaghou | 360/97.02 |
| 5,535,092 | A | 7/1996 | Bang | 361/685 |
| 5,566,049 | A | 10/1996 | Nguyen | 361/685 |
| 5,604,662 | A | 2/1997 | Anderson et al. | 361/685 |
| 5,652,695 | A | 7/1997 | Schmitt | 361/685 |
| 5,654,875 | A | 8/1997 | Lawson | 361/685 |
| 5,668,697 | A | 9/1997 | Dowdy et al. | 361/685 |
| 5,673,158 | A | 9/1997 | Ichimura | 360/97.01 |
| 5,684,671 | A | 11/1997 | Hobbs et al. | 361/683 |
| 5,687,059 | A | 11/1997 | Hoppal | 361/685 |
| 5,694,267 | A | 12/1997 | Morehouse et al. | 360/97.02 |
| 5,703,734 | A | 12/1997 | Berberich et al. | 360/97.02 |
| 5,734,989 | A | 3/1998 | Woodcock | 701/70 |
| 5,761,031 | A | 6/1998 | Ajmani | 361/685 |
| 5,797,667 | A | 8/1998 | Wu | 312/332.1 |
| 5,822,184 | A | 10/1998 | Rabinovitz | 361/685 |
| 5,858,509 | A | 1/1999 | Polch et al. | 428/166 |
| 5,978,212 | A | 11/1999 | Boulay et al. | 361/685 |
| 6,015,196 | A * | 1/2000 | Welch et al. | 312/223.2 |
| 6,088,222 | A | 7/2000 | Schmitt et al. | 361/686 |
| 6,094,342 | A * | 7/2000 | Dague et al. | 312/333 |
| 6,097,608 | A | 8/2000 | Berberich et al. | 361/752 |
| 6,289,678 | B1 | 9/2001 | Pandolfi | 62/3.2 |
| 6,320,744 | B1 * | 11/2001 | Sullivan et al. | 312/223.2 |

\* cited by examiner

DATA STORAGE HOUSING

CROSS-REFERENCE TO RELATED APPLICATIONS

This is a continuation of application Ser. No. 09/496,322, filed on Feb. 2, 2000 now U.S. Pat. No. 6,320,744, which claims benefit of Provisional Application No. 60/121,000 filed Feb. 19, 1999 for "Storage Array Module And Installation Frame" by Patrick L. Sullivan and Terrance A. Dilling, and claims benefit of Provisional Application No. 60/156,413 filed Sep. 28, 1999 for "Data Storage Device With Internal Isolation And Heat Transfer" by Clarence R. Mackley, Patrick L. Sullivan, Terrance A. Dilling and Nathan J. Hastad.

BACKGROUND OF THE INVENTION

This invention relates to electronic module housings, and particularly to housings for supporting data storage devices, such as magnetic disk drives, for use in hostile environments.

Magnetic and optical disk drives are employed as the principal memory unit for a wide variety of special and general purpose processors. These devices are characterized by a rotating disk and associated data transfer device for writing data to and reading data from the disk. Most disk drives are mounted in housings to protect the disk drive from the effects of environmental extremes, such as heat, humidity and mechanical stress, encountered in most normal operating conditions. However, these housings may not be suitable for certain environmental extremes. More particularly, certain military and space environments may subject the disk drive to extreme temperatures, pressures (or vacuum) and/or mechanical shock. For this reason, contractors supplying such units for use in these extreme conditions employed special housings to protect the disk drive from the environmental extremes that might be expected.

The data storage housings designed for extremely harsh conditions were designed to address only the specific conditions to which the data storage unit would be subjected. The reason for this is that special housings to address environmental extremes are expensive, add to the space and weight of the housed unit, and reduce the access to the unit for maintenance or salvage. Where space and weight are of concern, added volume and weight are minimized, usually by designing the housing to address only the environmental concerns to which the unit will be subjected. Ease of removal of the unit from the support platform is essential for maintenance as well as removal for salvage or destruction such as to prevent information stored on the disk drive from falling into unfriendly hands. Hence, there is a need for a housing for electronic units that protects the unit from environmental extremes, is cost effective, permits quick removal of the unit, and does not overly increase the weight or space of the unit.

Present housings designed for specific severe environmental conditions accommodate single data storage devices, such as a single disk drive system, and do not accommodate housing an array comprising a plurality of such devices. Data storage arrays are useful to meet requirements of storage redundancy, increased storage capacity and increased bandwidth. Hence, there is a need for a housing for an array of electronic units that meets the needs described above.

SUMMARY OF THE INVENTION

In a first embodiment of the invention, an array module includes a housing having a rear plate and opposing side walls defining a module chamber. A plurality of mounting locations, such as mounting slots, are provided on the side walls of the housing and in the module chamber. A plurality of electronic units, such as disk drives, have mounting features, such as mounting rails, along opposite sides and are assembled in an array to respective ones of the mounting locations on the side walls of the housing, so that the housing supports the electronic units in the module chamber. Although in the preferred embodiment the individual electronic units are fitted with rails that mate into corresponding slots, many other suitable mounting methods will be readily apparent to those of ordinary skill in the art. Each electronic unit has at least one connector, which can be a blind-mate connector, on a face that mates with one of a plurality of connectors on the housing. At least one connector, which can be a blind-mate connector on the rear plate, provides electrical connection to all of the electronic units.

An installation frame has a rear wall and opposing side walls defining an installation chamber. A connector, which can be a blind-mate connector on the rear wall of the installation frame, mates with the single connector on the rear plate of the storage array module housing and is connected to an external connector on the rear wall of the installation chamber. It will be readily apparent to those of ordinary skill in the art that different types and quantities of connectors may be used to provide the necessary connections. Also, the connectors can be placed at any locations that are convenient to other installation requirements. For example, the connectors can be located at the front of the module.

A plurality of resilient mounts are fastened to external surfaces, for example, on the side walls, of the installation frame to protect the frame and storage array module from external shock when the installation frame is mounted to a supporting platform. A thermal transfer mechanism transfers thermal energy between the electronic units and a region exterior to the installation frame.

In an optional but preferred form of this embodiment, a guide mount includes first slotted rails on the exterior of the side walls of the array housing and second slotted rails on the interior of the side walls of the installation frame such that the first and second slotted rails nest to support the array housing in the installation frame. Optionally, a cam lock in the slot formed by the nested rails rigidly fastens the array housing to the installation frame.

In one form of the thermal transfer mechanism, ventilation units, such as fans, extend through the rear wall of the installation frame, and heat transfer fins on the side walls of the array module housing dissipate heat to the ventilation units. In another form of the thermal transfer mechanism, a plurality of resilient thermal conductors have a first end permanently mounted to respective side walls of the installation frame, and thermal rails are permanently mounted to second ends of the resilient thermal conductors, the thermal rails being mounted to an external heat sink.

In a second embodiment of the present invention, an electronic unit, such as a disk drive, is enclosed in a chamber formed by at least a top cover and a bottom cover hermetically sealed to the top cover. A connector, which can be a blind-mate connector, on one of the covers mates with a connector on the electronic unit. The electronic unit has at least two side rails rigidly fastened to the unit, and a resilient support connects these side rails to at least one of the covers to resiliently support the electronic unit in the enclosure. The resilient support typically is formed of a material having a high resistance to thermal conduction. In such a case, at least two thermal rails are permanently mounted by a plurality of resilient thermal conductors to either the side rails or one of the covers. A fastener removably mounts the thermal rails to the other of the side rails or one of the covers so that the thermal rails and resilient thermal conductors provide conduction of thermal energy between the side rails and one of the covers. If thermally conductive resilient supports are provided, then these thermal conductors are not required.

In this embodiment of the invention, the enclosure may optionally include at least two mounting plates mounted to one of the covers, and the thermal conductors are permanently mounted to the side rails so that the fastener mounts the thermal rails to the mounting plates. In this form of the invention, the resilient support comprises resilient members of various possible shapes, such as bumpers, mounted between the respective side rails and respective mounting plates. Alternatively, the resilient support comprises a molded resilient isolator between the electronic unit and at least one of the covers to support the electronic unit in the enclosure.

In one form of the invention, electronic units fitted with the resilient members and heat transfer mechanisms of the second embodiment are arranged in the array module of the first embodiment.

DETAILED DESCRIPTION OF THE PREFERRED EMBODIMENT

Figure 1:
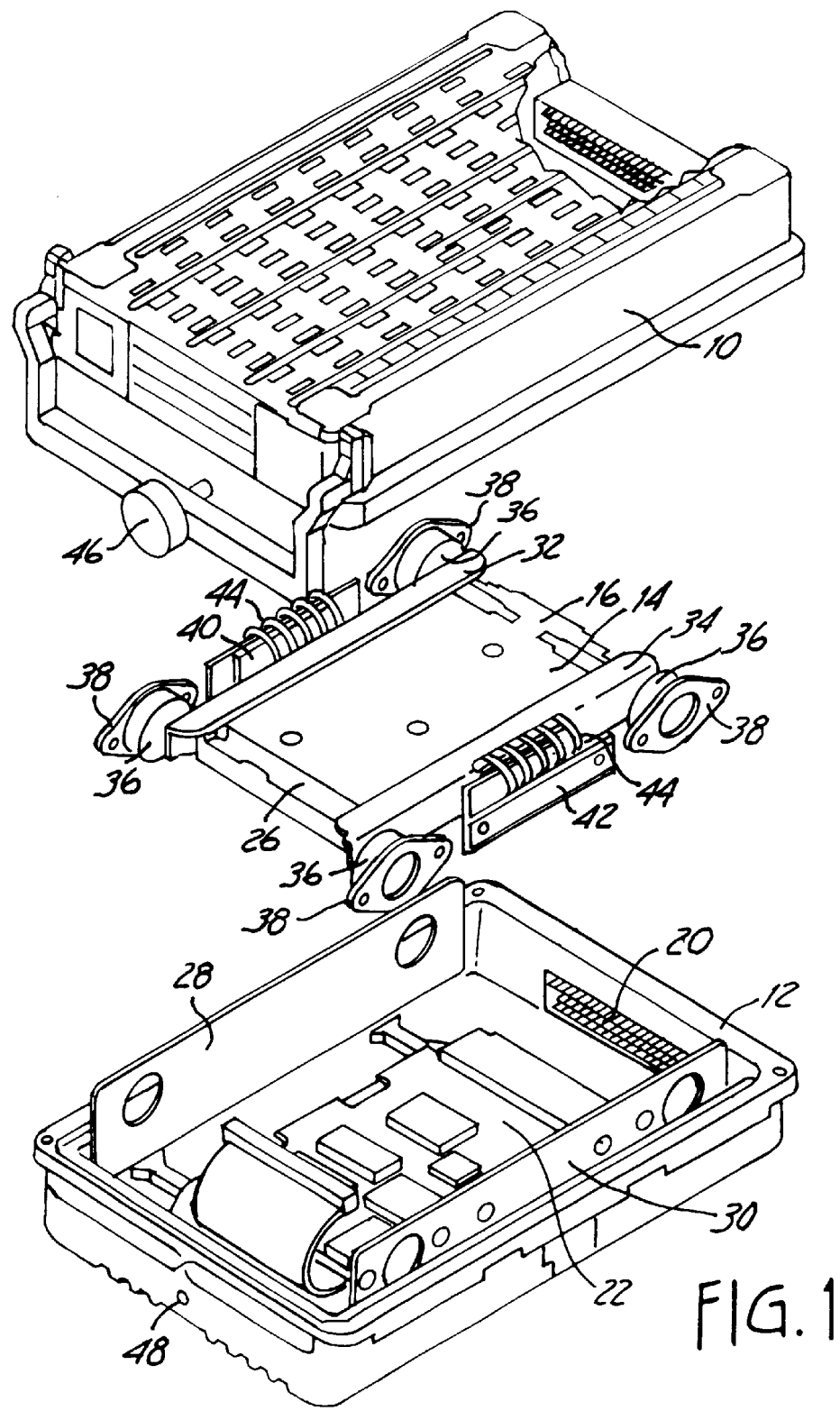
FIG. 1 is an exploded perspective view of a housing for receiving a data storage device in accordance with a first embodiment of the present invention.

FIG. 1 is a perspective view of a data storage housing in accordance with a first embodiment of the present invention. The housing includes a top cover 10 and a bottom cover 12 arranged to house a data storage device, such as a disk drive 14. Disk drive 14 illustrated in FIG. 1 has three connectors, a first blind-mate connector 16 arranged to mate with a connector (not shown) in top cover 10, a second blind-mate connector (not shown) arranged to mate with connector 20 in bottom cover 12, and a connector 26 arranged to mate with connector 24 attached to a flexible cable connected to circuit board 22. Circuit board 22 contains integrated circuits and is mounted on bottom cover 12 in the enclosure formed by covers 10 and 12. Board 22 may, for example comprise a signal translation module to permit the host computer to be connected to disk drive 14 by a communications bus suitable for remote peripherals.

Bottom cover 12 includes a pair of mounting rails 28 and 30 in direct thermal contact with cover 12. Similarly, disk drive 14 includes a pair of mounting rails 32 and 34 in thermal connection to the housing of the disk drive. Elastomeric bumpers 36 are mounted to rails 32 and 34, such as by threaded fasteners (not shown) and include resilient flanges 38 for mounting to plates 28 and 30, such as by threaded fasteners or by adhesive. Bumpers 36 and their integral flanges 38 may be constructed of any suitable resilient material, such as silicone or butyl rubber of neoprene, each of which displays high resistance to conduction of thermal energy. Thermally conductive bars 40 and 42 are thermally connected to respective rails 32 and 34 by a plurality of flexible thermally conductive cables 44. As one example, cables 44 may be constructed of a highly thermally conductive material, such as plural strands of copper wire. Bars 40 and 42 are arranged to be rigidly mounted to mounting plates 28 and 30 on bottom cover 12.

Disk drive 14, which may be a standard disk drive of commercial grade manufactured by a disk drive manufacturer, is assembled into the housing formed by covers 10 and 12 by attaching bumpers 36, with their included flanges 38, to rails 32 and 34 and attaching ends of cables 44 to rails 32 and 34, the other ends of cables 44 being attached to bars 40 and 42. Rails 32 and 34, with their appended bumpers 36 and bars 40 and 42, are attached to the sides of the disk drive. The assembly is then electrically connected to the bottom cover by connecting connector 24 on the flexible cable to connector 26 on the disk drive, and sliding the unit into place to connect the connector on the disk drive (not shown) to connector 20 on cover 12. Flanges 38 and bars 40 and 42 are then attached to plates 28 and 30. Top cover 10 is then slid into place connecting together connector 20 and the connector (not shown) in top cover 10. The unit is then securely fastened by thumbscrew 46 to threaded receptacle 48, thereby hermetically sealing disk drive 14 within the housing formed by covers 10 and 12. Electrical connection to the disk drive is accomplished through connectors 18 and 20 on the top and bottom cover, thereby providing data interface, power and other signals to the disk drive.

Some conventional devices are said to have "hermetically sealed" enclosures, but in fact do pass air and contaminants in vapor form, usually through a filter. In the preferred embodiment, the device of the present invention has a sealed module that does not allow the passage of gases or liquids and is able to maintain its original internal pressure, even when the external pressure has been reduced to zero. The enclosed hermetically sealed housing provides a rugged housing capable of sustaining mechanical shock due to the elastomeric bumpers and resilient flanges mounting the disk drive to the housing, yet good thermal connection is established through the flexible heat sink formed by thermal cables 44 to the external portions of the housing.

FIG. 1 illustrates flexible thermally conductive cables 44 being permanently connected between rails 32,34 and bars 40, 42 so that bars 40, 42 are assembled to mounting rails 28 and 30 during assembly of disk drive 14 into the housing. It may be desired in some cases to permanently connect cables 44 between mounting rails 28, 30 and bars 40, 42 so that bars 40, 42 are assembled to rails 32, 34 during assembly of the unit. Additionally, while FIG. 1 illustrates mounting rails 28, 30 as being attached to bottom cover 12, it may be desired in some cases to instead attach mounting rails 28, 30 to top cover 10.

Figure 2:
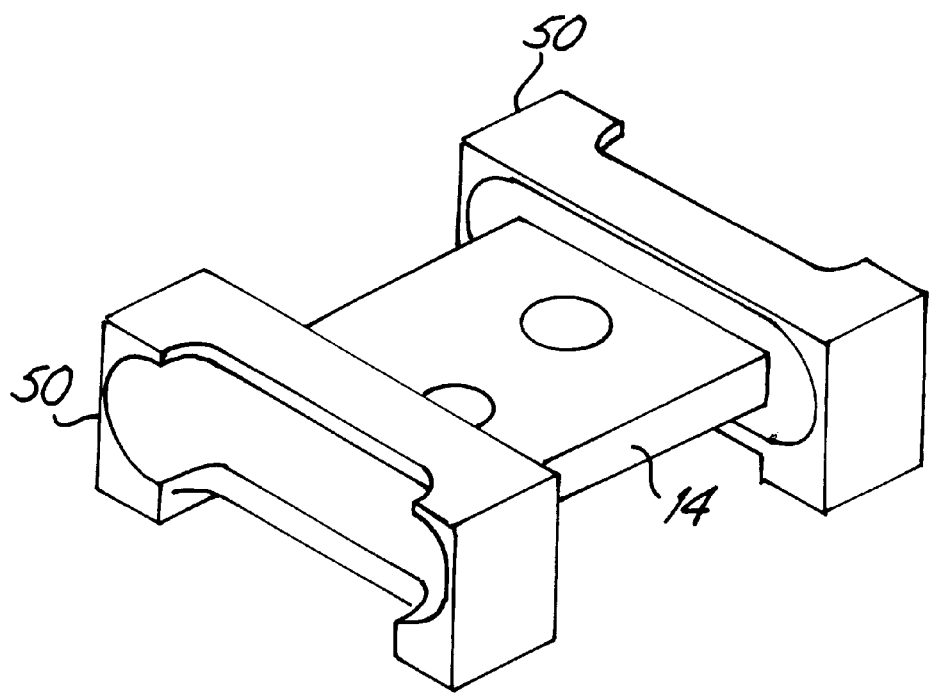
FIG. 2 is a perspective view of an alternate mounting arrangement for the data storage device illustrated in FIG. 1.

FIG. 2 illustrates a modification of the disk drive assembly shown in FIG. 1 in that instead of elastomeric bumpers 36 and flanges 38, the ends of disk drive 14 are fitted in molded resilient isolators 50 for inclusion within the housing formed by covers 10 and 12 (FIG. 1). For clarity, bars 40,42 and cables 44 are not shown in FIG. 2. In a preferred form, the isolators are formed by injecting an elastomeric material into the ends of the bottom cover with the disk drive mounted in place. The elastomeric material is injected in a moldable plastic or foam state so that when the top cover is fastened over the bottom cover, the elastomeric material sets to a cellular structure to hold the disk drive in place in the enclosure. Thus, isolators 50 do not necessarily have to be fastened to the housing, particularly if they are molded in place after assembly of the disk drive to the housing. In either case, it is preferred that the flexible heat sink of cables 44 and bar 42 connect the disk drive housing to the mounting plates 28, 30 (FIG. 1).

Figure 3:
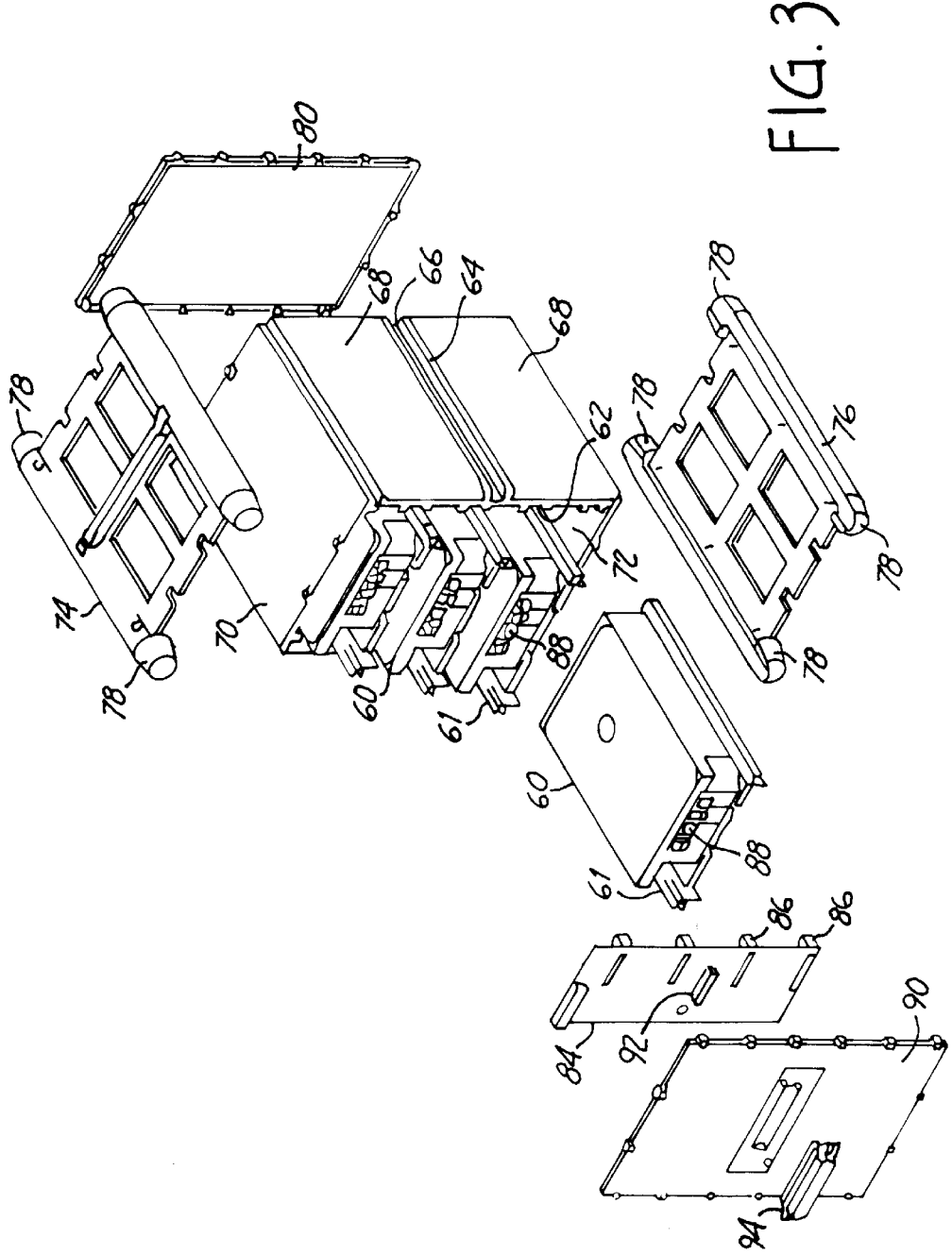
FIG. 3 is an exploded perspective view of a data storage array module for receiving a plurality of data storage devices in an array.
Figure 4:
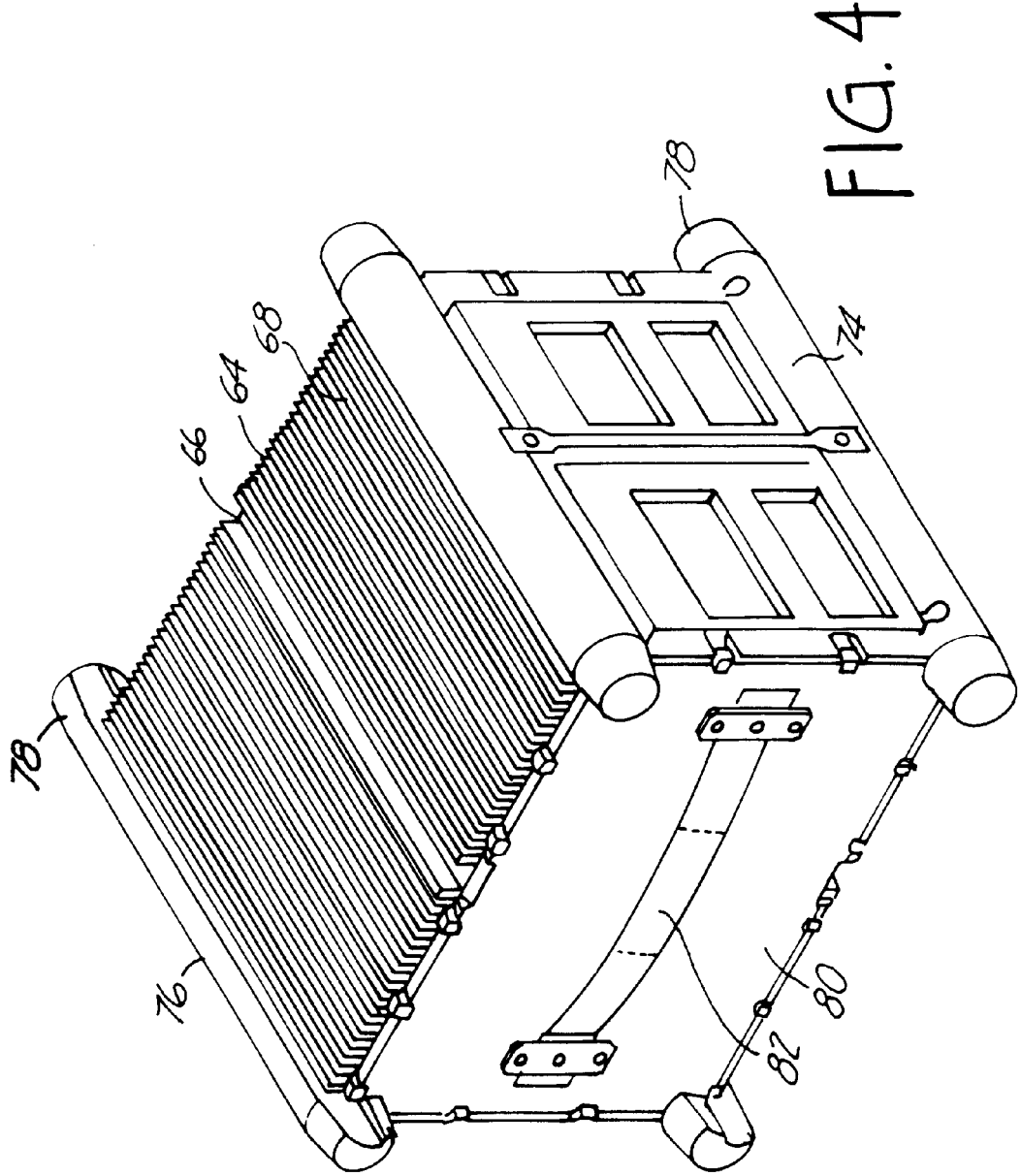
FIGS. 4 and 5 are perspective views of the assembled array module illustrated in FIG. 3.
Figure 5:
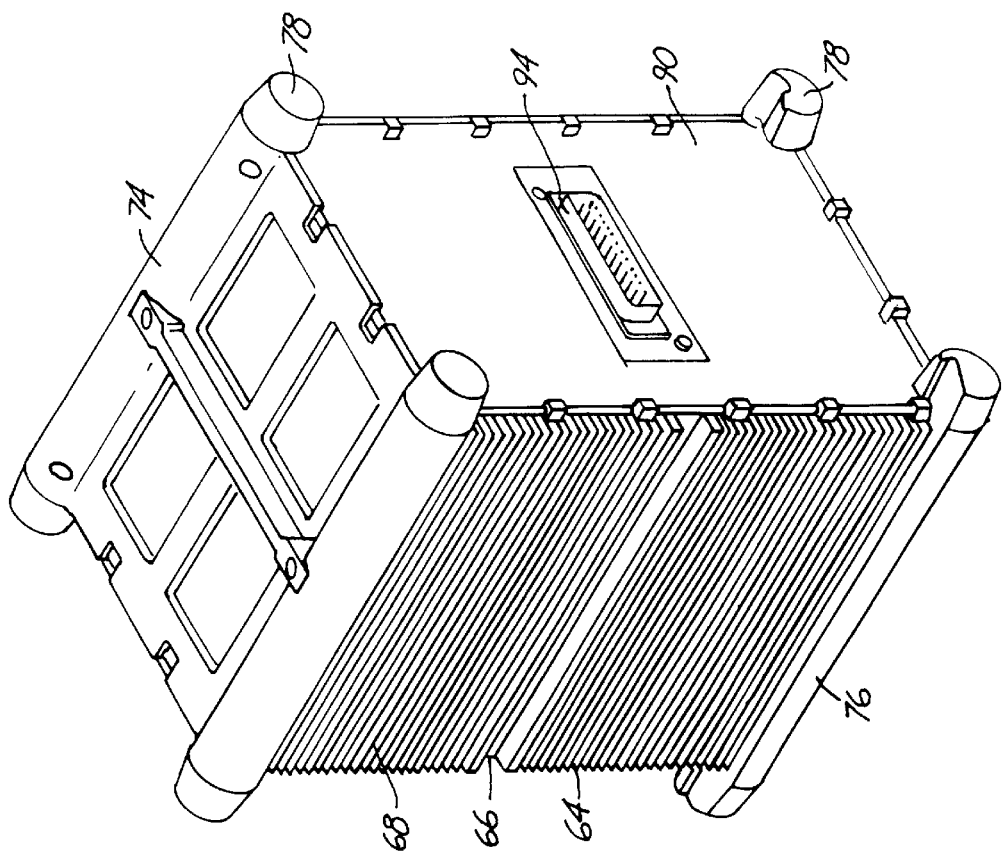

FIGS. 3–5 illustrate a data storage array module in accordance with one embodiment of the present invention. FIG. 3 is an exploded view of the data storage array and FIGS. 4 and 5 are perspective views of the module. In the embodiment illustrated in FIGS. 3–5, the module includes a chamber containing four disk drive units 60 that may, for example, be housed in housings illustrated in FIGS. 1 and 2. If desired, other electronic devices may be located within the module. Such devices may include, for example, disk array controllers, especially those designed to have the same general physical mounting and power requirements of a disk drive unit. Units 60 include side rails 61 that mate with and are supported in slots 62 integral with side walls 64 of the module. Wall 64 preferably includes a slotted rail 66 for purposes to be explained and heat sink fins 68 for dissipation of heat. The top and bottom of the module is enclosed by plates 70 and 72 enclosing the housing, and mounting frame 74 and 76 are mounted to respective covers 70 and 72. Frames 74 and 76 include bumpers 78 at each corner thereof extending forward and rearwardly of the module. The front face of the module is closed by cover 80 to which a carrying handle or strap 82 (FIG. 4) is fastened.

A connector plate 84 is an integrated circuit board having a plurality of blind-mate connectors 86 arranged to connect to blind-mate connectors 88 on disk drive units 60 and blind-mate connector 92 is connected to all connectors 86 to provide power and data communication to the disk drive units. Rear cover 90 fits over plate 84 so that blind-mate connector 94 connects to connector 92 on board 84 thereby providing electrical connection to connector 92.

Figure 6:
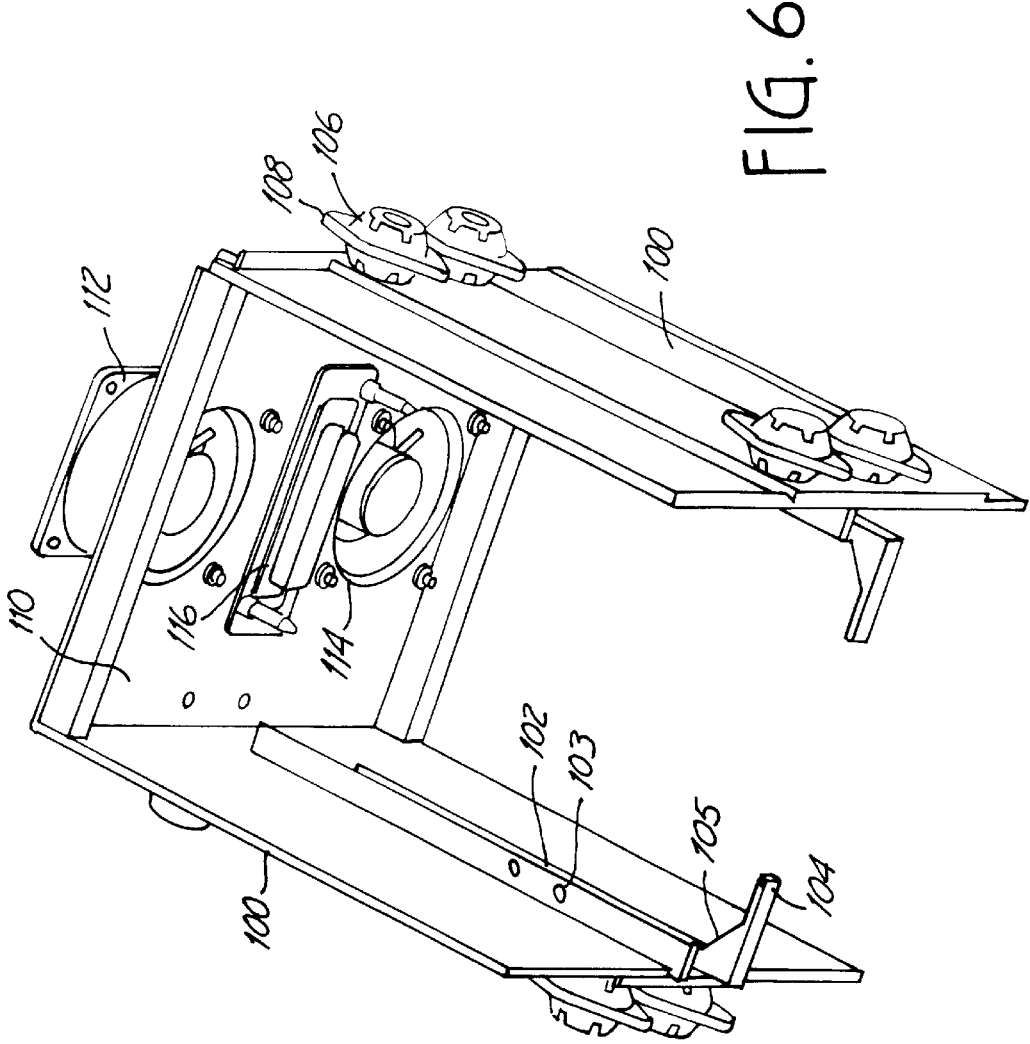
FIG. 6 is a perspective view of a data storage installation frame for use with the module illustrated in FIGS. 3–5.

FIG. 6 illustrates an installation frame for storage array module illustrated in FIGS. 3–5. The installation frame includes side walls 100 having internal slotted rails 102 arranged to accommodate slotted rails 66 in the side walls of the storage array module illustrated in FIGS. 3–5. As shown particularly in FIG. 6, a locking bar 104 is arranged to fit within the slot formed by slotted rails 66 and 102 when the storage array module is in place within the installation frame. Rail 102 includes a snap lock 103 to securely lock bar 104 in place within the rail to prevent the bar from being accidently removed. Bar 104 includes a cam surface 105 arranged to bear against the rear cover 90 of the storage array module when the bar is locked to rail 102 to thereby lock the storage array module into place in rigid assembly to the installation frame to prevent accidental disassembly. The rigid assembly of the storage array module assures good thermal connection between the storage array module and the installation frame for thermal conduction purposes. Elastomeric bumpers 106 having resilient mounting flanges 108 are mounted to the external portions of the side walls 100 of the installation frame. An end wall 110 includes ventilation fans 112 and 114 to draw cool air into the region surrounding the storage array module, and blind-mate connector 116 is arranged to connect to connector 94 on the storage array module. Connector 116 provides external connection for the disk drive.

Figure 7:
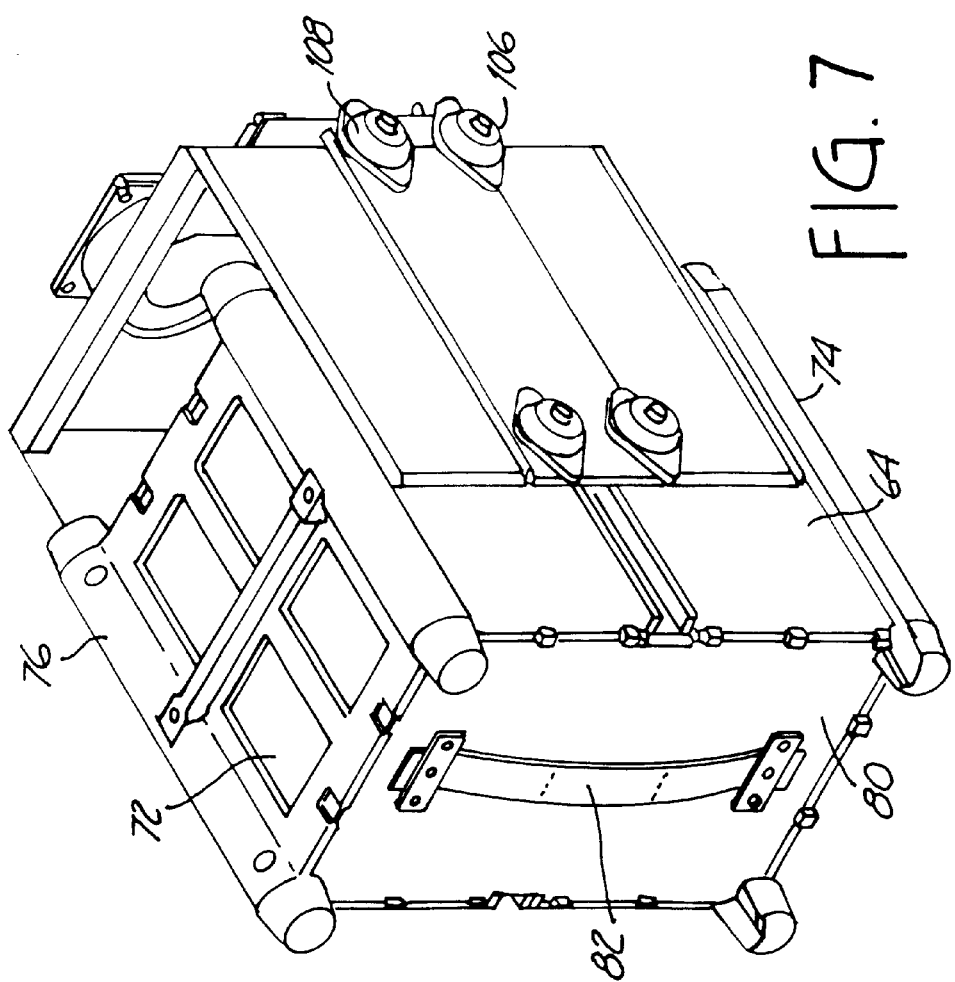
FIG. 7 is a perspective view illustrating the assembly of the data storage module of FIGS. 3–5 and the installation frame of FIG. 6.

FIG. 7 illustrates the assembly of the storage array module of FIGS. 3–5 to the installation frame of FIG. 6, with the completed unit having external connection through connector 116 (FIG. 6). The six walls of the completed and assembled unit comprise the side walls 100 of the installation frame, wall 110 of the installation frame, covers 70 and 72 of the storage array module and their associated frames 74 and 76, and front cover 80 of the storage array module.

In the assembly and use of the storage array module of FIGS. 3–5 and installation frame illustrated in FIG. 6, the array module of FIGS. 3–5 is assembled with the top, bottom, side and front walls completed. Disk drive units 60 are slid into place within the module enclosure so that the disk drive units 60 are supported by the side rails 62 within the enclosure. Rear cover 84 is then assembled over the rear portion of the module so that connection is made to each of the disk drive units. Rear cover 90 is assembled to the module to hermetically seal the module, protecting the disk drives from the effects of humidity, pressure and contaminants in the environment.

The installation frame of FIG. 6 is mounted to a support platform (not shown) by fastening flanges 108 of bumpers 106 to the support platform, thereby isolating the frame from mechanical vibration and shock to which the support platform may be subjected. Lock bars 104 are removed from the slotted rails 102 to permit the assembled storage array module to be slid into place. With the storage module assembled to the installation frame, lock bars 104 are inserted into the slotted rails in a position 90° from the position illustrated in FIG. 6. Bars 104 are then rotated 90° to the position illustrated in FIG. 6 so that cam surface 105 bears against the storage array module and lock 103 engages to lock the bar into place. The cam surface assures a rigid assembly of the storage array module into the installation frame (which is mounted by elastomeric bumpers 25 to the support platform), thereby assuring good thermal connection of the storage array module to the frame, and assuring good mechanical isolation from the support platform.

If it becomes necessary to remove the disk drives from the support platform, such as for maintenance purposes or to avoid the drives from falling into unfriendly hands in the event of evacuation, the lock bars are simply rotated 90 to the assembly position and the storage array module is removed from the frame using handle 82. As the storage array module is removed from the installation frame, the lock bars slide out and fall away.

Figure 8:
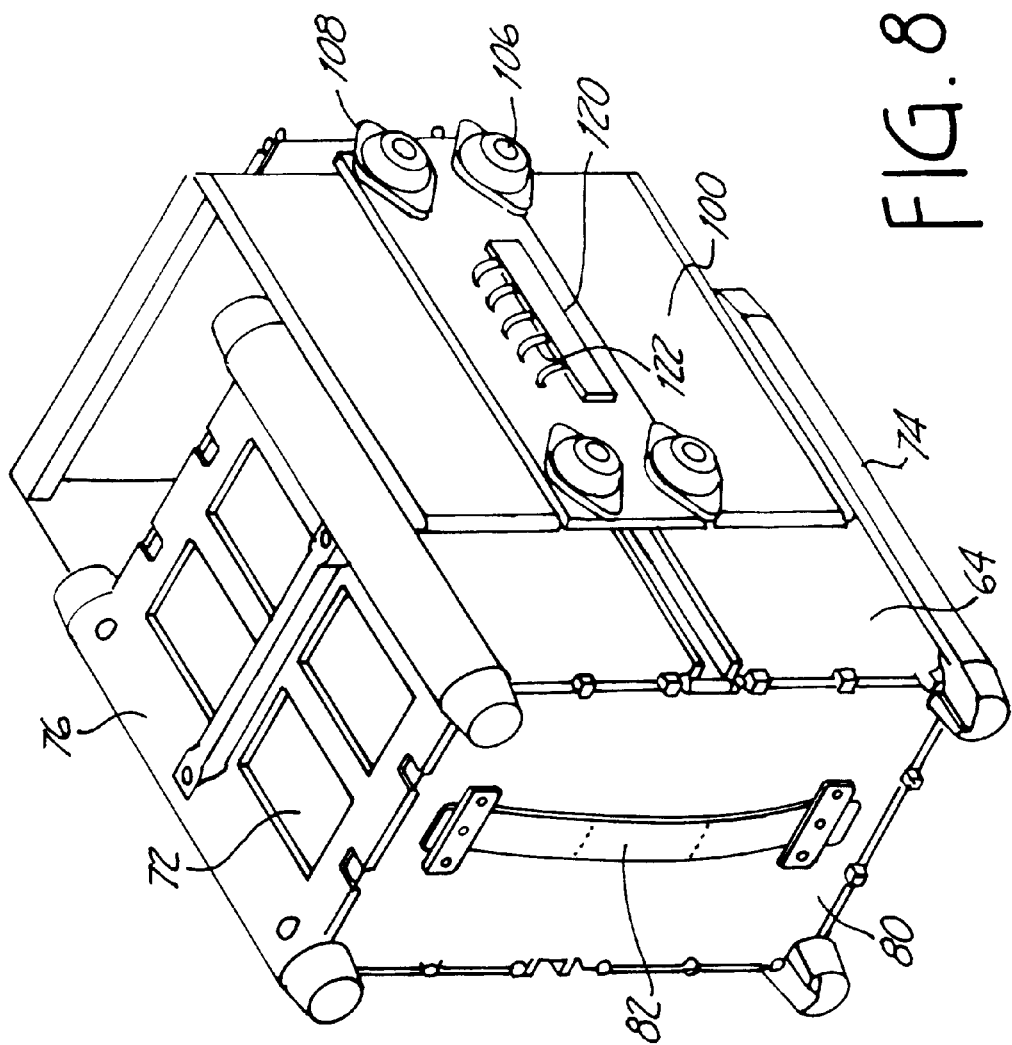
FIG. 8 is a perspective view, as in FIG. 7, illustrating the assembly of a data storage module according to FIGS. 3–5 with a modification of the installation frame according to the present invention.

FIG. 8 illustrates a modified version of the assembly in which an additional thermally conductive bar 120 is resiliently mounted to the walls 100 of the installation frame by flexible and resilient thermal cables 122. The inclusion of bar 120 and thermal cables 122 may permit elimination of cooling fans 112 and 114 (FIG. 6). In either case, thermally conductive bar 120 is mounted to the support platform for the installation frame.

In addition to providing thermal conduction for the units, thermal bar 40, 42 and 120 and the associated thermal cables 44 and 122 may be employed for electrically grounding the units and housings, thereby serving the dual functions of thermal conductivity and grounding.

The storage array module of FIGS. 3–5 permits two or more data storage devices (e.g., disk drives) to be physically linked together into a single unit in a shell formed by the installation frame and the walls of the module that enclose the data storage devices to protect the devices from adverse environmental conditions. Preferably the shell is a rigid aluminum structure made up from extruded or machined plates, bonded together with hardware, structural adhesives, and a gasket at the interface to a maintenance access cover that covers all components and provides a hermetic seal that prevents the passage of air, liquids, dust and other contaminants. Other construction techniques, such as welding or brazing, and other materials, such as stainless steel, may be used that provide the same features of strength and environmental isolation. The shell provides physical protection of the data storage devices against damage through contact with foreign objects (e.g., loose tools or hardware) and electrostatic discharge. The shell also provides protection against both the intrusion of interfering electromagnetic energy and the radiation of electromagnetic energy into the environment.

Slotted guide rails 66 and 102 support the weight of the storage array module shown in FIGS. 3–5 in the installation frame shown in FIGS. 6–8 so that the storage array module remains rigidly attached to the installation frame under severe shock and vibration conditions. Each hermetically sealed blind-mate connection includes a portion 94 (FIGS. 3 and 5) mounted on and hermetically sealed to the storage array module that mates with a corresponding portion 116 (FIG. 6) mounted to the installation frame, so that when the storage array module is assembled to the installation frame, the blind-mate connections provide electrical interconnections between the installation frame and the storage array module.

Temperature sensing and control mechanisms within the storage array module maintain the correct operating temperature for the data storage devices when the ambient temperature and/or initial starting temperature is outside of the range of temperatures required for reliable operation of the data storage devices. These controls include the ability to inhibit the operation of the data storage devices if a proper operating temperature has not been achieved. The preferred design incorporates heating elements arranged to provide even heat distribution across each of the data storage devices; a single temperature sensing point is used to control the application of power to all heating elements simultaneously; and the flow of current in the +12 V dc supply lead to each data storage device is inhibited when the sensed temperature is too cold or too hot. These functions may be performed individually for each drive or sub-element of the storage array module in some embodiments. Other devices such as Peltier Junctions may also be employed to both provide heat and to remove heat.

The shell is designed to provide good thermal conductivity between the data storage devices and the body of the storage array module so as to minimize the temperature rise, while at the same time permit easy insertion and removal of individual data storage devices for manufacture and repair The latching bar 104 (FIG. 6) is arranged with a cam mechanism to assure positive physical contact between the storage array module and the installation frame to thereby provide a rigid, high frequency, connection between the installation frame and the storage array module and assure good heat transfer characteristics and avoid the introduction of any low frequency mechanical resonances.

The installation frame provides all the interfacing functions between the storage array module and the central computer. While the internal elements of the storage array module are preferably hermetically sealed from adverse environmental conditions, the installation frame elements may be subject to such conditions. Fans 112 and 114 (FIG. 7) provide outside air heating or cooling. The installation frame supports the storage array module and protects the module from adverse effects of mechanical shock and vibration. The module itself is hermetically sealed from the effects of adverse liquids and gas. Thus, the housings and modules of the present invention provide effective storage of electrical arrays and units as well as relieving thermal and mechanical stress to the arrays and units.

Although the present invention has been described with reference to preferred embodiments, workers skilled in the art will recognize that changes may be made in form and detail without departing from the spirit and scope of the invention.

What is claimed is:

1. An apparatus comprising:
    an array module having:
        a housing having a rear plate and opposing side walls defining a module chamber,
        a plurality of mounting locations on said side walls of said housing and in said module chamber,
        a plurality of electronic units having at least one mounting feature fixed thereto, said at least one mounting feature being assembled to at least one of respective ones of said mounting locations so that said housing supports said electronic units in said module chamber, each of said electronic units having at least one first connector,
        a plurality of second connectors in said module chamber, each said first connector on said electronic units mating with a respective second connector, and
        at least one third connector on said housing connected to said plurality of second connectors to provide electrical connection to each of said, plurality of electronic units;
    an installation frame having;
        a rear wall and opposing side walls defining an installation chamber,
        a plurality of resilient mounts fastened to external surfaces of said installation frame, each said mount being arranged to be fastened to a support platform to isolate said installation frame from mechanical shock or vibration in said support platform,
        at least one fourth connector on said installation frame, said at least one fourth connector mating with said at least one third connector, and
        at least one external connector connected to said at least one fourth connector for providing electrical connection to said at least one fourth connector; and
    heat transfer means for transferring thermal energy between said electronic units and a region exterior to said installation frame.

2. The apparatus of claim 1 wherein said first, second, third and fourth connectors are blind-mate connectors.

3. The apparatus of claim 1 wherein said plurality of mounting locations comprise a plurality of mounting slots.

4. The apparatus of claim 1 further comprising means for mounting said array housing in said installation frame.

5. The apparatus of claim 1 wherein said heat transfer means comprises ventilation units through at least one of said rear wall and opposing side walls of said installation frame, and a plurality of heat transfer features en said side walls of said array module.

6. The apparatus of claim 1 wherein said heat transfer means comprises:
    a plurality of resilient thermal conductors each having a first end permanently mounted to respective external sides of said side walls of said installation frame, and at least two thermal rails arranged to be mounted to an external heat sink, each said thermal rail being permanently mounted to second ends of respective resilient thermal conductors.

7. The apparatus of claim 1 wherein said storage array module includes top, bottom and front walls enclosing said module chamber, and at least one resilient bumper mounted to at least one of said top, front, and bottom walls.

8. The apparatus of claim 1 wherein each of said plurality of electronic units is housed in an enclosure having a fifth connector on an end thereof, each said enclosure comprising:
- a top cover;
- a bottom cover arranged to mate with said top cover to form a hermetically sealed enclosure chamber;
- a sixth connector on one of said top and bottom covers arranged to mate with said fifth connector;
- at least two side rails for rigidly fastening to said electronic unit;
- a resilient support connected to said at least two side rails and to at least one of said top and bottom covers for resiliently supporting said electronic unit in said enclosure chamber, said resilient support being formed of a material having a high resistance to thermal conduction;
- at least two thermal rails;
- at least one resilient thermal conductor having a first end permanently mounted to a respective one of said thermal rails and a second end permanently mounted to one of the group consisting of said side rails, said top cover and said bottom cover; and
- a fastener removably mounting said thermal rails to another of the group consisting of said side rails, said top cover and said bottom cover so that said thermal rails and resilient thermal conductors provide conduction of thermal energy between said side rails and one of said covers.

9. The apparatus of claim 1 wherein said heat transfer means comprises ventilation units through one or more of said side walls of said installation frame, and a plurality of heat transfer features on said side walls of said array module.

10. The apparatus of claim 1 wherein said storage array module includes top, bottom, side and front walls enclosing said module chamber, and at least one resilient bumper mounted to at least one of said top, bottom, side and front walls.

11. The apparatus of claim 1 wherein each of said plurality of electronic units is housed in an enclosure having a fifth connector on an end thereof, each said enclosure comprising:
- a top cover;
- a bottom cover arranged to mate with said top cover to form a hermetically sealed enclosure chamber;
- a sixth connector on one of said top and bottom covers arranged to mate with said fifth connector;
- at least two side rails for rigidly fastening to said electronic unit;
- a thermally conductive resilient support connected to said at least two side rails and to at least one of said top and bottom covers for resiliently supporting said electronic unit in said enclosure chamber and for conducting thermal energy between said two side rails and one of said top and bottom covers.

12. The apparatus of claim 3 wherein said mounting features comprise a plurality of mounting rails.

13. The apparatus of claim 4 wherein said mounting means comprises a guide mount between said array module and said installation frame, said guide mount including first rails on the exterior side of said side walls of said array housing and second rails on the interior side of said side walls of said installation frame, said first and second rails nesting to support said array housing in said installation frame.

14. The apparatus of claim 5 further comprising a guide mount between said array module and said installation frame, said guide mount including first rails on the exterior side of said side walls of said array housing and second rails on the interior side of said side walls of said installation frame, said first and second rails nesting to support said array housing in said installation frame.

15. The apparatus of claim 6 further comprising a guide mount between said array module and said installation frame, said guide mount including first rails on the exterior side of said side walls of said array housing and second rails on the interior side of said side wails of said installation frame, the first and second rails nesting to support said array housing in said installation frame.

16. The apparatus of claim 8 further comprising at least two mounting plates mounted to one of said top and bottom cover, said thermal conductors having their second ends permanently mounted to a respective side rail, and wherein said fastener mounts said thermal rails to respective mounting plates.

17. The apparatus of claim 8 wherein said resilient support comprises a molded resilient isolator between said electronic unit and at least one of said top and bottom covers to support said electronic unit in said enclosure.

18. The apparatus of claim 8 further comprising a circuit board within said enclosure chamber, and a flexible cable connector connected to said circuit board for connecting to said electronic unit.

19. The apparatus of claim 13 wherein said nested first and second rails extend orthogonal to said rear wall of said installation frame and said rear plate of said array housing and form a slot along the length of said rails, the apparatus further including
- a locking feature for rigidly fastening said array housing to said installation frame.

20. The apparatus of claim 14 wherein said nested first and second rails extend orthogonal to said rear wall of said installation frame and said rear plate of said array housing and form a slot along the length of said rails, the apparatus further including
- a locking feature for rigidly fastening said array housing to said installation frame.

21. The apparatus of claim 15 wherein said nested first and second rails extend orthogonal to said rear wall of said installation frame and said rear plate of said array housing and form a slot along the length of said rails, the apparatus further comprising
- a locking feature for rigidly fastening said array housing to said installation frame.

22. The apparatus of claim 16 wherein said resilient support comprises resilient bumpers mounted between said respective side rails and respective mounting plates.

23. An enclosure for an electronic unit, the electronic unit having at least one first connector on an end thereof, the enclosure comprising:
- a top cover;
- a bottom cover arranged to mate with said top cover to form a hermetically sealed enclosure;
- at least one second connector on one of said top and bottom covers arranged to mate with said first connector;

at least two side rails rigidly fastened to the electronic unit;
a resilient support connected to said at least two side rails and to at least one of said top and bottom covers for resiliently supporting the electronic unit in said enclosure, said resilient support being formed of a material having a high resistance to thermal conduction;
at least two thermal rails;
at least one resilient thermal conductor having a first end permanently mounted to a respective one of said at least two thermal rails and a second end permanently mounted to one of the group consisting of said side rails, said top cover and said bottom cover;
a fastener removably mounting said thermal rails to another of the group consisting of said side rails, said top cover and said bottom cover so that said thermal rails and resilient thermal conductors provide conduction of thermal energy between said side rails and one of said covers.

24. The enclosure of claim 23 further comprising at least two mounting plates mounted to one of said top and bottom cover, said thermal conductors having their second ends permanently mounted to a respective one of said at least two side rails, and wherein said fastener mounts said thermal rails co respective mounting plates.

25. The enclosure of claim 23 wherein said resilient support comprises a molded resilient isolator between the electronic unit and at least one of said top and bottom covers to support the electronic unit in said enclosure.

26. The enclosure of claim 23 further comprising a circuit board within said enclosure, and a flexible cable connector connected to said circuit board for connecting to the electronic unit.

27. The enclosure of claim 23 wherein said second connector is a blind-mate connector.

28. The enclosure of claim 21 wherein said resilient support comprises resilient bumpers mourned between said respective side rails and respective mounting plates.

29. An apparatus, comprising:
an array module having:
a housing having a rear plate and opposing side walls defining a module chamber,
a plurality of mounting locations on said side walls of said housing and in said module chamber,
a plurality of electronic units having at least one mounting feature fixed thereto, said at least one mounting feature being assembled to at least one respective ones of said mounting locations so that said housing supports said electronic units in said module chamber, each of said electronic units having at least one first connector,
a plurality of second connectors in said module chamber, each said first connector on said electronic units mating with a respective second connector, and
at least one third connector on said housing connected to said plurality of second connectors to provide electrical connection to each of said plurality of electronic units;
an installation frame having:
a rear wall and opposing side walls defining an installation chamber,
a plurality of resilient mounts fastened to external surfaces of said installation frame, each said mount being arranged to be fastened to a support platform to isolate said installation frame from mechanical shock or vibration in said support platform,
at least one fourth connector on said installation frame, said at least one fourth connector mating with said at least one third connector, and
at least one external connector connected to said at least one fourth connector for providing electrical connection to said at least one fourth connector.

30. An apparatus, comprising:
an array module having:
a housing having a rear plate and opposing side walls defining a hermetically sealed module chamber,
a plurality of mounting locations on said side walls of said housing and in said module chamber,
a plurality of electronic units having at least one mounting feature fixed thereto, said at least one mounting feature being assembled to at least one of respective ones of said mounting locations so that said housing supports said electronic units in said module chamber, each of said electronic units having at least one first connector,
a plurality of second connectors in said module chamber, each said first connector on said electronic units mating with a respective second connector, and
at least one third connector on said housing connected to said plurality of second connectors to provide electrical connection to each of said, plurality of electronic units;
an installation frame having:
a rear wall and opposing side walls defining an installation chamber,
a plurality of resilient mounts fastened to external surfaces of said installation frame, each said mount being arranged to be fastened to a support platform to isolate said installation frame from mechanical shock or vibration in said support platform,
at least one fourth connector on said installation frame, said at least one fourth connector mating with said at least one third connector, and
at least one external connector connected to said at least one fourth connector for providing electrical connection to said at least one fourth connector; and
heat transfer means for transferring thermal energy between said electronic units and a region exterior to said installation frame.

31. The apparatus of claim 30 wherein each of said plurality of electronic units is housed in an enclosure having a fifth connector on an end thereof, each said enclosure comprising:
a top cover;
a bottom cover arranged to mate with said top cover to form a hermetically sealed enclosure chamber;
a sixth connector on one of said top and bottom covers arranged to mate with said fifth connector;
at least two side rails for rigidly fastening to said electronic unit;
a resilient support connected to said at least two side rails and to at least one of said top and bottom covers for resiliently supporting said electronic unit in said enclosure chamber, said resilient support being formed of a material having a high resistance to thermal conduction;
at least two thermal rails;
at least one resilient thermal conductor having a first end permanently mounted to a respective one of said thermal rails and a second end permanently mounted to one of the group consisting of said side rails, said top cover and said bottom cover; and a fastener removably mounting said thermal rails to another of the group consisting of said side rails, said top cover and said bottom cover so that said thermal rails and resilient thermal conductors provide conduction of thermal energy between said side rails and one of said covers.

32. The apparatus of claim 30 further comprising at least two mounting plates mounted to one of said top and bottom cover, said thermal conductors having their second ends permanently mounted to a respective side rail) and wherein said fastener mounts said thermal rails to respective mounting plates.

33. The apparatus of claim 31 further comprising a circuit board within said enclosure chamber, and a flexible cable connector connected to said circuit board for connecting to said electronic unit.

34. The apparatus of claim 31 wherein said resilient support comprises a molded resilient isolator between said electronic unit and at least one of said top and bottom covers to support said electronic unit in said enclosure.

35. The apparatus of claim 32 wherein said resilient support comprises resilient bumpers mounted between said respective side rails and respective mounting plates.

36. An enclosure for an electronic unit, the electronic unit having at least one first connector on an end thereof, the enclosure comprising:

a top cover;
a bottom cover arranged to mate with said top cover to form a hermetically sealed enclosure;
at least one second connector on one of said top and bottom covers arranged to mate with said first connector;
at least two side rails rigidly fastened to the electronic unit;
a thermally conductive resilient support connected to said at least two side rails and to at least one of said top and bottom covers for resiliently supporting said electronic unit in said enclosure chamber and for conducting thermal energy between said two side rails and one of said top and bottom covers.

37. An apparatus, comprising:
a stack of at least two enclosures for electronic units, the electronic units having a first connector on an end thereof and, each said enclosure comprising:

a top cover;
a bottom cover arranged to mate with said top cover to form a hermetically sealed enclosure;
at least one second connector on one of said top and bottom covers arranged to mate with said first connector;
at least two side rails rigidly fastened to the electronic unit;
a resilient support connected to said at least two side rails and to at least one of said top and bottom covers for resiliently supporting the electronic unit in said enclosure, said resilient support being formed of a material having a high resistance to thermal conduction;
at least two thermal rails;
at least one resilient thermal conductor having a first end permanently mounted to a respective one of said at least two thermal rails and a second end permanently mounted to one of the group consisting of said side rails, said top cover and said bottom cover;
a fastener removably mounting said thermal rails to another of the group consisting of said side rails, said top cover and said bottom cover so that said thermal rails and resilient thermal conductors provide conduction of thermal energy between said side rails and one of said covers.

38. An apparatus, comprising:
a stack of at least two enclosures for electronic units, said electronic units having a first connector on an end thereof, each said enclosure comprising:
a top cover,
a bottom cover arranged to mate with said top cover to form a hermetically sealed enclosure chamber;
a sixth connector on one of said top and bottom covers arranged to mate with said fifth connector;
at least two side rails for rigidly fastening to said electronic unit;
a thermally conductive resilient support connected to said at least two side rails and to at least one of said top and bottom covers for resiliently supporting said electronic unit in said enclosure chamber and for conducting thermal energy between said two side rails and one of said top and bottom covers.

* * * * *